(12) United States Patent
Mauri et al.

(10) Patent No.: US 6,920,021 B2
(45) Date of Patent: Jul. 19, 2005

(54) SUNKEN ELECTRICAL LEAD DEFINED NARROW TRACK WIDTH MAGNETIC HEAD

(75) Inventors: Daniele Mauri, San Jose, CA (US); Tao Pan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 315 days.

(21) Appl. No.: 10/229,248

(22) Filed: Aug. 26, 2002

(65) Prior Publication Data

US 2004/0037014 A1 Feb. 26, 2004

(51) Int. Cl.$^7$ ................................................. G11B 5/39
(52) U.S. Cl. ....................................................... 360/322
(58) Field of Search ................................. 360/322, 320, 360/324, 324.1, 324.2, 325, 119–121

(56) References Cited

U.S. PATENT DOCUMENTS

| | | | |
|---|---|---|---|
| 3,987,485 A | 10/1976 | Sugaya et al. ................. 360/63 |
| 5,168,409 A | * 12/1992 | Koyama et al. ............ 360/317 |
| 5,296,987 A | 3/1994 | Anthony et al. ............ 360/113 |
| 5,458,908 A | 10/1995 | Krounbi et al. ............. 427/123 |
| 5,568,335 A | * 10/1996 | Fontana et al. ............. 360/320 |
| 5,880,910 A | 3/1999 | Shouji et al. ............... 360/113 |
| 6,025,977 A | 2/2000 | Hu et al. .................... 360/113 |
| 6,342,993 B1 | * 1/2002 | Sato ........................... 360/319 |
| 6,525,913 B1 | * 2/2003 | Mauri et al. ................ 360/320 |
| 6,628,484 B2 | * 9/2003 | Werner ....................... 360/319 |
| 6,657,824 B1 | * 12/2003 | Onuma ....................... 360/319 |

FOREIGN PATENT DOCUMENTS

| | | |
|---|---|---|
| JP | 4143914 | 5/1992 |
| JP | 4188418 A | 7/1992 |
| JP | 7254118 | 10/1995 |
| JP | 8329426 | 12/1996 |
| JP | 9115112 | 5/1997 |

* cited by examiner

*Primary Examiner*—Angel Castro
(74) *Attorney, Agent, or Firm*—Robert O. Guillot; Intellectual Property Law Offices

(57) ABSTRACT

In fabricating the magnetic head, a first magnetic shield layer (S1) is fabricated upon a substrate base, followed by a thin first insulation layer (G1). A photoresist mask is fabricated upon the G1 layer and electrical lead recesses are milled through the G1 layer and into the S1 layer. An insulation layer is deposited into the electrical lead recesses, followed by the fabrication of electrical leads within the recesses. The photoresist is removed and a magnetoresistive (MR) sensor is subsequently fabricated on top of the G1 layer, such that portions of the MR sensor are fabricated on top of portions of the electrical leads. Hard bias elements are then fabricated at outboard edges of the MR sensor. A thin second insulation layer (G2) is fabricated on top of the MR sensor and hard bias elements, and a second magnetic shield layer (S2) is fabricated on top of the G2 layer.

23 Claims, 3 Drawing Sheets

SUNKEN ELECTRICAL LEAD DEFINED NARROW TRACK WIDTH MAGNETIC HEAD

BACKGROUND OF THE INVENTION

1. Field of the Invention

The present invention relates generally to magnetoresistive (MR) read heads for use in magnetic heads for hard disk drives, and more particularly to a read head in which the leads are sunken through the G1 insulative layer and into the S1 shield layer, and wherein the track width is defined by the electrical lead spacing.

2. Description of the Prior Art

As is well known to those skilled in the art, hard disk drives store data in the form of magnetic data bits in a plurality of circular tracks on magnetic disks within the disk drive. To increase the areal data storage density of the disk, it is generally necessary to write smaller magnetic bits, such that an increased number of circular tracks per inch (TPI) can be written on the disk surface, and an increased number of data bits per inch (BPI) can be written within each circular data track. To read such smaller data bits accurately, it is necessary to develop smaller read head structures, such that individual data bits can be accurately discriminated in the data reading process.

Generally, prior art read heads include a magnetoresistive (MR) sensor that is disposed between two magnetic shields, wherein two insulation layers (one on each side of the MR sensor) electrically insulate the MR sensor from the magnetic shields. The spacing between the two magnetic shields is a significant parameter in allowing the MR sensor to discriminate between successive magnetic data bits of a data track, and the width of the MR sensor is a significant parameter in allowing the MR sensor to read data bits only from a single data track (and not read from adjacent data tracks, termed side reading). One way to reduce the shield to shield spacing is to reduce the thickness of the insulation layers that separate the MR sensor from the magnetic shields. However, significant difficulties have arisen in prior art read head structures in that electrical lead members must be disposed between the shields to make electrical contact with the MR sensor to provide read head data output signals. The insulation gap layers must be thick enough to provide adequate electrical insulation between the electrical leads and the magnetic shields, and the thickness of the leads in prior art heads has made the fabrication of this electrical insulation more problematic. Additionally, the sensitivity of the sensor is significantly reduced at narrow track widths, due to magnetic stiffening caused by the hard bias material at the MR sensor element edges. A need therefore exists for a read head structure in which the insulation layers can be fabricated as thin as is practical to avoid electrical shorts, such that the sensor gap distance can be reduced, and in which the read track width of the read head can likewise be reduced. As will appear from the following description, the present invention utilizes a sunken electrical lead structure that accomplishes these objectives.

SUMMARY OF THE INVENTION

The hard disk drive of the present invention includes the magnetic head of the present invention having an improved read head structure. In fabricating the read head, a first magnetic shield layer (S1) is fabricated upon a substrate base, and a thin first insulation layer (G1) is fabricated upon the S1 layer. A photoresist mask is fabricated upon the G1 layer and electrical lead recesses or trenches are milled through the G1 layer and into the S1 layer. The spacing width W between the electrical leads subsequently determines the read track width of the magnetic head. An insulation layer is deposited into the electrical lead recesses, followed by the fabrication of electrical leads within the recesses. The photoresist is removed and a magnetoresistive (MR) sensor is subsequently fabricated on top of the G1 layer, such that portions of the MR sensor are fabricated on top of portions of the electrical leads. Hard bias elements are then fabricated at outboard edges of the MR sensor, a thin second insulation layer (G2) is then fabricated on top of the MR sensor and hard bias elements, and a second magnetic shield layer (S2) is fabricated on top of the G2 layer.

The G1 layer and G2 layer can be fabricated to be as thin as is required to electrically insulate the MR sensor, such that the spacing between the S1 shield and S2 shield can be minimized. The distance W between the electrical leads acts to substantially determine the read track width of the MR sensor. The present invention also obtains good track resolution by minimizing stray signals arising from the outer MR sensor portions that lie between the inner edges of the electrical leads and the hard bias edges. This is accomplished through electrical shunting of the MR signal due to the inward placement of the electrical leads, and through magnetic stiffening of outer portions of the MR sensor layers caused by the proximity of the hard bias edges.

It is an advantage of the magnetic head of the present invention that it has a reduced MR sensor gap distance.

It is another advantage of the magnetic head of the present invention that the G1 layer and G2 layer may be fabricated as thin as is practical.

It is a further advantage of the magnetic head of the present invention that the read track width is determined by the distance between the electrical leads.

It is yet another advantage of the magnetic head of the present invention that it can read an increased number of bits per inch in a data track.

It is yet a further advantage of the magnetic head of the present invention that it can read an increased number of tracks per inch.

It is an advantage of the method for fabricating a magnetic head of the present invention that the electrical leads are fabricated into electrical lead recesses formed within portions of the S1 shield.

It is another advantage of the method for fabricating a magnetic head of the present invention that the electrical leads are insulated from the S1 shield by an insulation layer that may be thicker than the G1 layer.

It is an advantage of the hard disk drive of the present invention that it includes a magnetic head of the present invention which has a reduced MR sensor gap distance.

It is an advantage of the hard disk drive of the present invention that it includes a magnetic head of the present invention in which the G1 layer and G2 layer may be fabricated as thin as is practical.

It is an advantage of the hard disk drive of the present invention that it includes a magnetic head of the present invention in which the read track width is determined by the distance between the electrical leads.

It is an advantage of the hard disk drive of the present invention that it includes a magnetic head of the present invention which can read an increased number of bits per inch in a data track.

It is an advantage of the hard disk drive of the present invention that it includes a magnetic head of the present invention which can read an increased number of tracks per inch.

These and other features and advantages of the present invention will no doubt become apparent to those skilled in the art upon reading the following detailed description which makes reference to the several figures of the drawings.

IN THE DRAWINGS

DETAILED DESCRIPTION OF THE PREFERRED EMBODIMENTS

Figure 1:
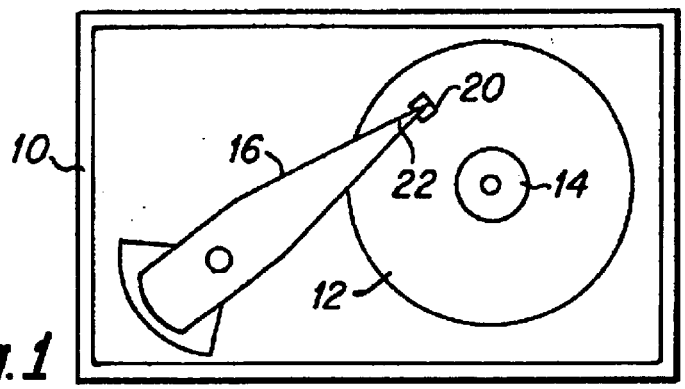
FIG. 1 is a top plan view generally depicting a hard disk drive of the present invention that includes a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

In order to increase the areal data storage density of a hard disk drive, such as is depicted in FIG. 1, it is desirable to increase the number of bits per inch (BPI) of data bits that are written in a data track on the surface disk 12, and it is likewise desirable to increase the number of tracks per inch (TPI) of data tracks that are written upon the disk surface. To accomplish such an increase in BPI and TPI it is basically necessary to write smaller data bits upon the disk surface and it is likewise necessary to read these smaller data bits that are written onto the disk surface. A typical prior art read head structure is next described with the aid if FIG. 2 to provide a basis for understanding the improvements of the present invention.

Figure 2:
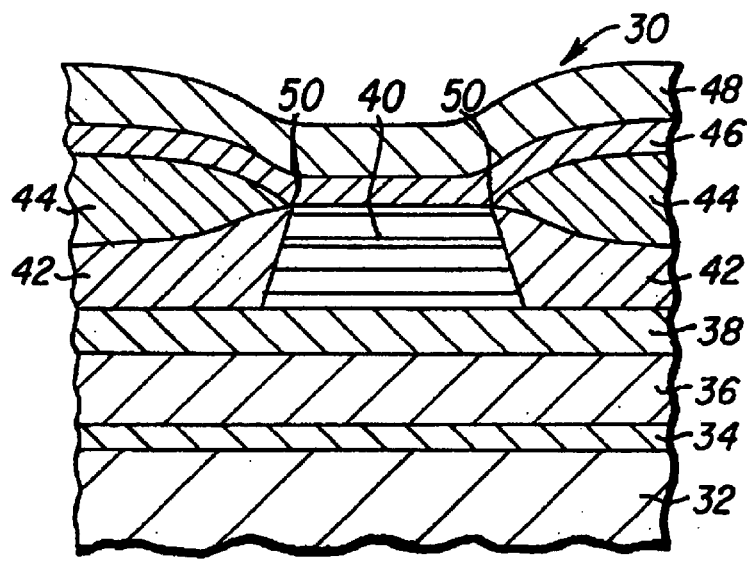
FIG. 2 is a side cross-sectional view depicting a typical prior art read head.

As depicted in FIG. 2, a typical prior art read head 30 includes a substrate base 32 with an insulation layer 34 formed thereon. A first magnetic shield (S1) 36 is fabricated upon the insulation layer and a first insulation layer (G1) 38 of the read head is fabricated upon the S1 magnetic shield 36. A magnetoresistive sensor 40, comprising a plurality of layers of specifically chosen materials, is then fabricated upon the G1 layer 38. Outer sections of the MR sensor layers are removed, typically by ion milling, and a hard bias element 42 is deposited on each side of the remaining MR sensor layers 40. Thereafter, electrical leads 44 are fabricated upon the hard bias elements 42 and a second insulation layer (G2) 46 is subsequently fabricated across the top of the device. Thereafter, a second magnetic shield (S2) 48 is fabricated upon the G2 layer.

With regard to features of the present invention that are described herebelow, it is significant to note that the prior art head requires a relatively thick G1 layer 38 to assure good electrical insulation between the electrical leads 44 (and hard bias elements 42) and the S1 magnetic shield 36. Additionally, a relatively thick G2 insulation layer 46 is required due to the relatively steep topography at the junction 50 of the electrical leads 44 with the MR sensor element 40. Additionally, the track width of the prior art head is determined by the width of the MR sensor element 40, and it is known that the MR sensor element layers cannot be reduced in width below a relatively large value without a significant loss in sensitivity due to the magnetic stiffening of the outer portions of the MR element layers that is caused by the proximity of the hard bias elements 42. Nevertheless, as will be understood by those skilled in the art, to obtain higher areal data storage densities, it is necessary to reduce the width of the active region of the read head MR sensor, and it is likewise necessary to reduce the spacing between its two magnetic shields. One way to reduce the spacing between the S1 and S2 shields is to reduce the thickness of the G1 and G2 insulation layers; however, as indicated above, reducing the thickness of the G1 and G2 layers in the prior art devices can result in electrical shorts and thus degrade the performance of the magnetic head. As will appear from the following description, the present invention resolves these problems.

In the present invention, as is described in greater detail hereinbelow, electrical lead recesses or trenches are milled through the thin G1 layer and into the thicker S1 magnetic shield layer. Thereafter, a layer of electrical insulation material is deposited into the recesses and the electrical leads are then deposited into the recesses and on top of the electrical insulation material. This construction facilitates the fabrication of thinner G1 and G2 layers, and FIGS. 3–9, which are next described, depict detailed fabrication steps that are utilized to fabricate the read head of the present invention.

Figure 3:
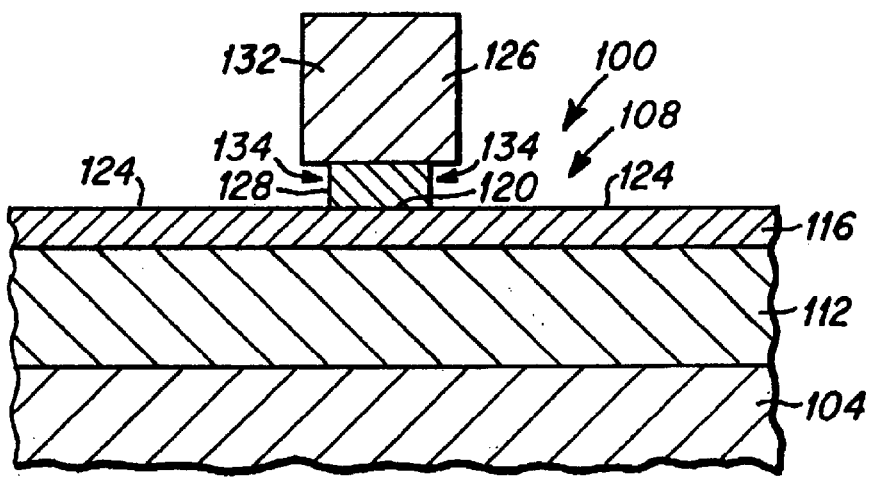
FIG. 3 is a side cross-sectional view depicting an initial fabrication step for fabricating the read head of the present invention.

FIG. 3 is a side cross-sectional view of a portion of a wafer substrate 104 upon which a plurality of magnetic heads 108 are fabricated. As is well known to those skilled in the art, many magnetic heads 100 are simultaneously fabricated upon the surface of a wafer substrate 104 utilizing thin film deposition and photolithographic techniques. Following the wafer level fabrication, the magnetic heads 100 are separated by slicing the wafer, such that many discrete magnetic heads 100 are ultimately fabricated from a single wafer. Thus, FIG. 3, as well as FIGS. 4–9 depict the fabrication of a read head portion 108 of a single magnetic head 100 upon the surface of such a wafer substrate 104, it being understood that many such magnetic heads 100 are simultaneously being fabricated upon the wafer substrate.

As depicted in FIG. 3, a first magnetic shield layer (S1) 112 is deposited upon the surface of the wafer substrate 104.

Thereafter, a thin insulation layer (G1) 116 is deposited upon the S1 layer 112, by a process such as sputter deposition. The G1 layer 116 may be composed of a material such as alumina, and can be fabricated as thin as is practical to provide electrical insulation between the S1 shield and the magnetoresistive sensor that is fabricated on top of the G1 layer, as is described below. Following the fabrication of the G1 layer 116, a photolithographic process is next conducted to fabricate a patterned photoresist that covers the G1 layer 116 at the central location 120 at which the MR sensor is to be fabricated, and exposes the G1 layer in outer locations 124 next to the MR sensor region 120 where the electrical leads and the hard bias will next be fabricated, as is described below with the aid of FIG. 4. As depicted in FIG. 3, the preferred patterned photoresist structure is a two layer photoresist 126, including a bottom layer 128 and a top layer 132, in which the bottom layer 128 is formed with an undercut 134 that aids in the fabrication of subsequent structures as well as the liftoff of the photoresist 126, as is well known to those skilled in the art.

Figure 4:
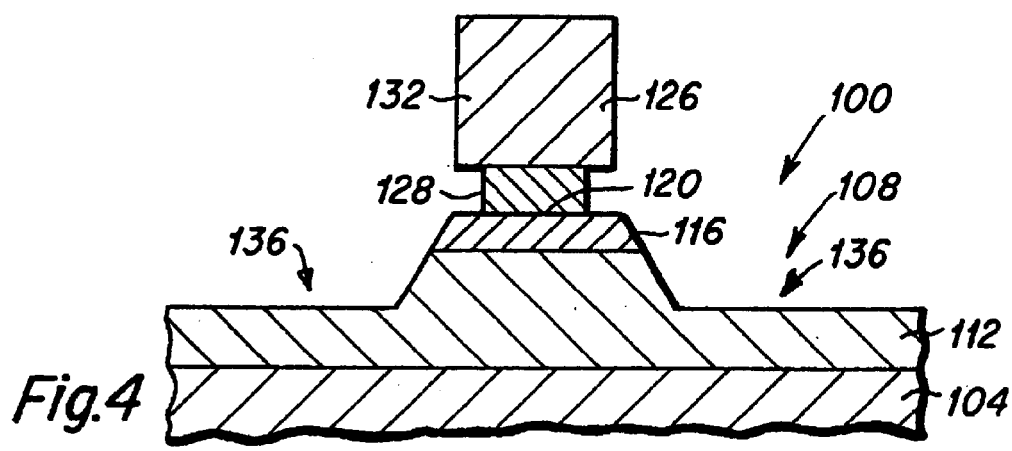
FIG. 4 is a side cross-sectional view depicting another fabrication step for fabricating the read head of the present invention.
Figure 5:
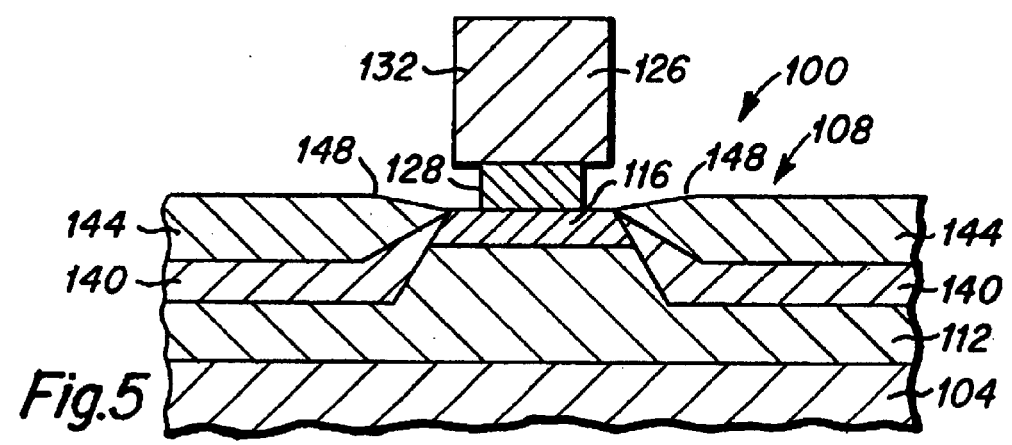
FIG. 5 is a side cross-sectional view depicting a further fabrication step for the read head of the present invention.
Figure 6:
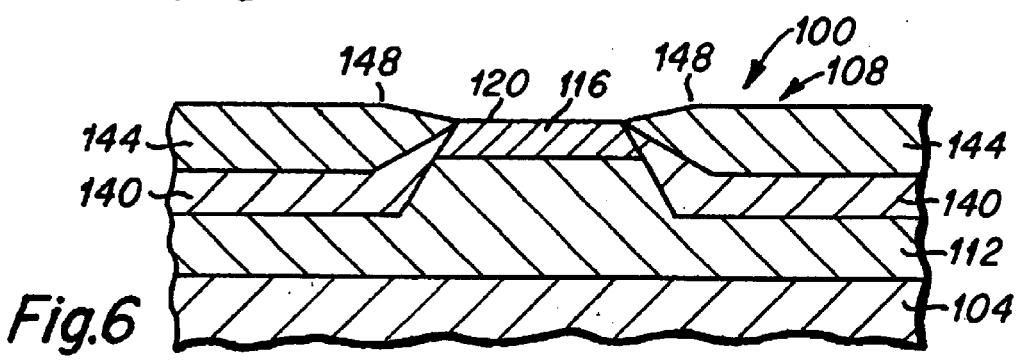
FIG. 6 depicts yet another fabrication step for the read head of the present invention.

FIG. 4 is a side elevational view of a further fabrication step of the read head portion 108 of the magnetic head 100 of the present invention. As depicted in FIG. 4, following the fabrication of the patterned photoresist 126, the wafer is exposed to a broad beam ion milling process in which the exposed portions 124 of the G1 layer 116 are milled, to create electrical lead recesses or trenches 136, and the milling depth of the recesses will also include portions of the S1 shield layer 112 due to the desired thinness of the G1 layer 116. Thereafter, as depicted in FIG. 5, a layer of electrically insulative material 140, such as alumina, is deposited, such as in a sputter deposition process, across the surface of the wafer, and into the milled recesses to cover the S1 shield 112 that was exposed in the milling process. Thereafter, electrical lead material 144, such as tantalum, is deposited (such as in a sputter deposition process), across the surface of the wafer and onto the alumina insulative layer 140 that was deposited within the recesses 136 upon the S1 shield 112. Following the deposition of the lead material, the patterned photoresist 126 is removed, such as by use of a chemical solvent, and FIG. 6 is a side cross-sectional view of the wafer at this fabrication stage. As depicted in FIG. 6, it is preferable that the deposition of the electrical lead material 144 be somewhat above the surface of the G1 layer 116, such that raised areas 148 exist, and the physical location of the central area 120 of the G1 layer 116, upon which the MR sensor is to be fabricated, can be easily physically located after the photoresist 126 has been removed. However, the raised areas 148 of the electrical leads 144 should not be so high as to create a significantly uneven surface for the deposition of the MR sensor layers that follow, as is next described.

Figure 7:
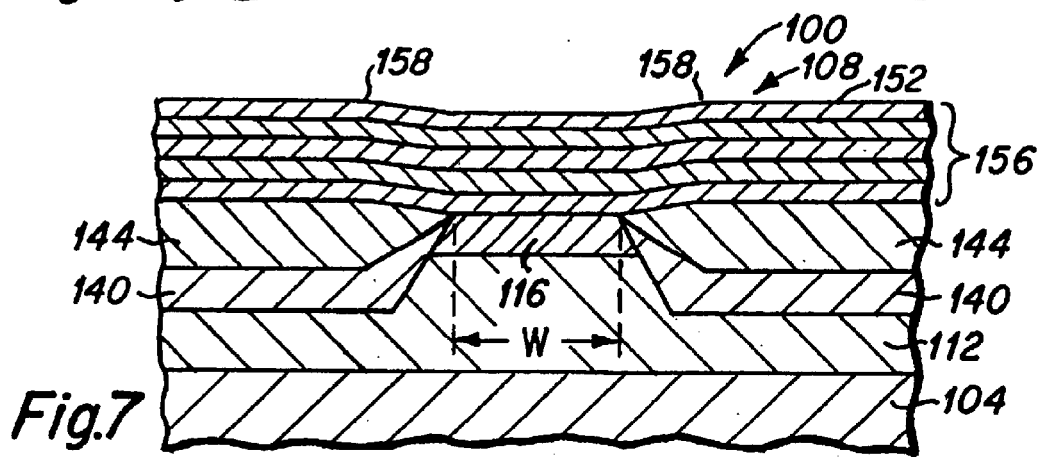
FIG. 7 depicts yet a further fabrication step for the read head of the present invention.

Thereafter, as depicted in FIG. 7, an MR sensor 152 comprising a plurality of MR sensor layers 156 is fabricated upon the surface of the wafer. Various types of MR sensors, and GMR sensors, comprised of various layers of various materials are well known to those skilled in the art, and may be fabricated upon the wafer surface in accordance with the present invention. Thus, the present invention is not to be limited to any particular type of MR or GMR sensor layer design. The raised areas 148 of the electrical leads create corresponding raised areas 158 in the top surface of the MR sensor 152. The raised areas 158 aid in the subsequent alignment of a second patterned photoresist, as is next described.

Figure 8:
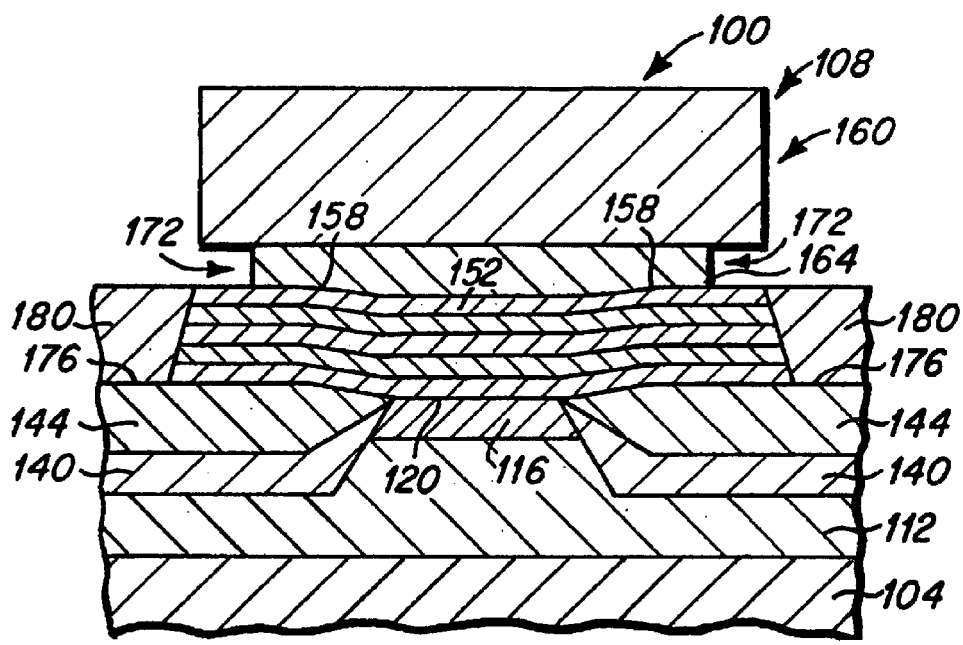
FIG. 8 depicts still another fabrication step for the read head of the present invention.

Thereafter, as depicted in FIG. 8, a second patterned photoresist 160 is fabricated upon the wafer surface above the central area 120 of the G1 layer 116 utilizing well known photolithographic techniques. The patterned photoresist preferably is fabricated as a two layer photoresist including a bottom layer 164 and a top layer 168 with a preferred undercut 172 for ease of fabrication and photoresist liftoff, as is well understood by those skilled in the art. The patterned photoresist 160 is aligned above the central area 120 of the G1 layer 116 with the help of the raised areas 158 of the MR sensor 152. Following the fabrication of the patterned photoresist 160, the wafer is exposed to a broad beam ion milling process, in which the uncovered outer portions of the magnetoresistive sensor layers 156 are removed to expose the upper surface 176 of the electrical leads 144. Thereafter, hard bias elements 180 are fabricated, such as by a sputter deposition process, on top of the exposed electrical lead surfaces 176 and on each side of the remaining magnetoresistive sensor material 152 that is covered by the patterned photoresist.

As is next depicted in FIG. 9, the patterned photoresist is subsequently removed from the wafer surface, such as by use of a chemical solvent. The stripe height of the MR sensor is next fabricated in a further photolithographic step that is well known to those skilled in the art and not depicted herein. Thereafter, a thin G2 electrical insulation layer 184 is deposited across the sensor surface, followed by the fabrication of a second magnetic shield (S2) 188 upon the surface of the G2 layer 184. The thickness of the G2 insulation layer can likewise be made as thin as the electrically insulative properties of the G2 layer material will allow. Typically, the G2 layer 184 can be fabricated to be as thin as the G1 layer 116. Following the fabrication of the S2 layer 188, further fabrication steps as are known to those skilled in the art may be undertaken to fabricate a write head portion of the magnetic head 100 of the present invention, and following the fabrication thereof, the wafer substrate may be sliced to ultimately produce individual magnetic heads 100 that are ultimately incorporated within hard disk drive components to create a hard disk drive 10 of the present invention which includes the magnetic head 100 of the present invention having a read head configuration 108 described hereinabove.

Having described the fabrication of the read head portion 108 of the magnetic head 100 of the present invention in detail, some important characteristics of the read head will now be apparent. Firstly, the thickness of the G1 layer 116 is not controlling as far as electrical insulation between the electrical leads 144 and the S1 shield 112. Rather, the thickness of the deposited alumina layer 140 provides electrical insulation of the S1 shield 112 from the electrical leads 144. Thus the G1 layer 116 can be fabricated to be as thin as is practicable for the material comprising the G1 layer to insulate the MR sensor 152 from the S1 shield 112. Likewise, as indicated above, the G2 layer 184 can be as thin as the G2 layer material allows to insulate the S2 shield 188 from the MR sensor 152 and the hard bias elements 180. This is important because the spacing between the S1 shield 112 and S2 shield 188 is a significant parameter in determining the ability of the read sensor to resolve closely spaced data bits, and the thinner the gap distance between the S1 and S2 shields, the greater the areal data storage density of the disk can be made.

A read head of the present invention can be fabricated with G1 and G2 insulation layers thinner than 100 Å. The G1 layer can be fabricated as thin as 10 Å since it does not need to withstand the MR layer milling process of the prior art, and also because the area under which it provides insulation (the MR sensor element area) is typically much less than one square micron. As indicated above, in the prior art head, the G1 layer provides insulation over a much larger area, including the sensor and a substantial portion of the hard bias elements, as is seen in FIG. 2. This larger insulation area increases the probability of electrical shorting through defects and pin holes in the prior art G1 layer, whereby a thicker G1 layer is required in the prior art devices.

Regarding the G2 layer, it can also be made thinner in the present invention by virtue of the reduced topography afforded by the design of the present invention. As indicated above, in the prior art read heads, a significant topographical step is created at the junction of the leads and the MR sensor, which step is difficult to cover with the G2 insulation layer. As a result, a thick G2 insulation layer is deposited in order to insure that electrical shorting from the electrical leads to the S2 shield does not occur. Thus, because the topography of the present invention is reduced, a G2 layer thickness that is below 100 Å is realizable. Thus, a read head of the present invention can include a G1 insulation layer having a thickness of as little as 10 Å and a G2 insulation layer having a thickness of less than 100 Å, and where the MR sensor element has a thickness T, the shield to shield spacing of the read head of the present invention can be designated as T+10 Å+100 Å. Where the MR sensor has a thickness T of 400 Å, the shield to shield spacing will therefore be 510 Å.

A further feature of the present invention is that the thickness of the electrical leads 144 is not a problematic parameter in the fabrication of the magnetic head 100 in that the depth of the ion milling through the G1 layer 116 and into the S1 shield 112 to create recesses 136 is a generally non-critical parameter. Thus, the recess depth is selected such that the thickness of the alumina insulation layer 140 plus the thickness of the leads 144 is approximately equal to the necessary recess depth with a preferred though not necessary provision to create the raised areas 148 of the electrical leads 144. Additionally, the read track width of the read head 108 is basically determined by the width W between the electrical leads 144, and that width W is determined by the width of the patterned photoresist 126 that was deposited upon the G1 layer 116.

Figure 9:
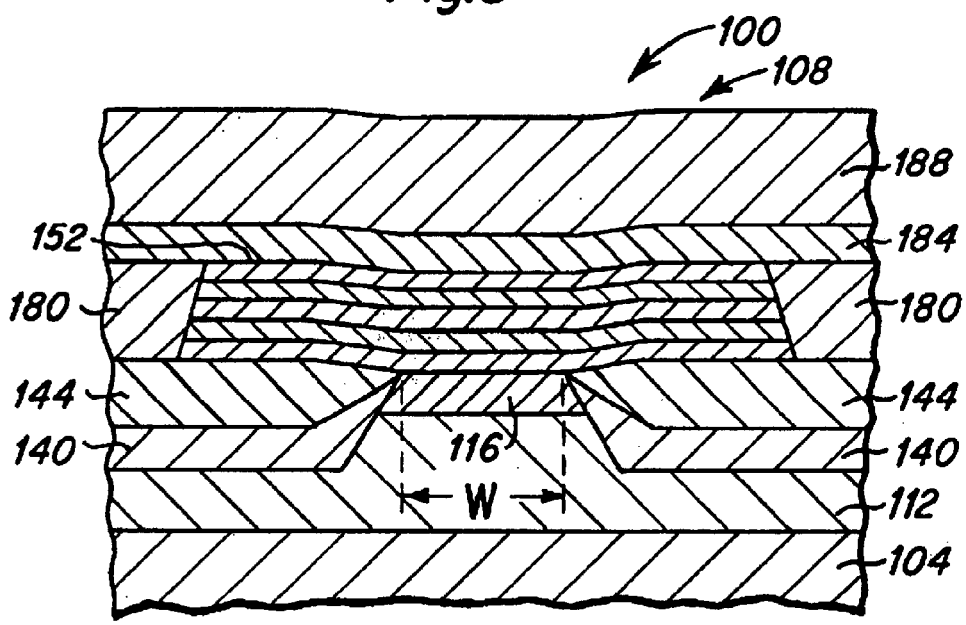
FIG. 9 depicts still a further fabrication step for the read head of the present invention.

As depicted in FIG. 9, the MR sensor 152 is fabricated to be wider than the width W between the electrical leads 144, and the hard bias elements 180 are fabricated on either side of the MR sensor layer 152. As is seen in FIG. 8, the width of the MR sensor layer is determined by the width of the patterned photoresist 160 that was fabricated on top of the MR sensor layers 152. As is well known by those skilled in the art, the hard bias elements 180 can effectively magnetically stiffen the outer portion of the MR sensor layer 152 located immediately next to the hard bias elements 180, such that these outer regions of the MR sensor are not effective in reading data from a hard disk. Thus, by widening the MR sensor 152 above the electrical leads 144, the central portion of the MR sensor 152 located above the central area 120 of the G1 layer 116 and between the electrical leads 144 is not affected by the magnetic stiffening effect of the hard bias elements 180, and it remains fully sensitive and able to read data bits from a hard disk 12 during a disk reading process of the hard disk drive 10 of the present invention. Where the outer region of the MR sensor 152 that is adversely affected by proximity to the hard bias elements 180 is approximately 0.1 microns, the active central region of the MR sensor can be from 0.1 to 0.2 microns, and a width W between the electrical leads of 0.1 to 0.2 microns provides a read track width that is suitable for high areal data storage density disks. Thus, a preferred embodiment of the present invention is fabricated with a S1 shield to S2 shield spacing of approximately 500 Å to 800 Å with a typical gap of approximately 600 Å, in which the G1 and G2 layer thicknesses are approximately 100 Å each, and the MR element thickness is approximately 400 to 600 Å. The read track width W is generally determined by the width W between the electrical leads and is controlled by photolithographic limits, and can be from approximately 0.1 to 0.2 microns.

While the present invention has been shown and described with regard to certain preferred embodiments, it is to be understood that those skilled in the art will no doubt develop certain alterations and modifications in form and detail that nevertheless include the true spirit and scope of the present invention. It is therefore intended that the following claims cover all such alterations and modifications in form and detail which do include the spirit and scope of the present invention.

What we claim is:

1. A magnetic head including a read head, comprising:

a substrate base;

a first magnetic shield layer (S1) being fabricated upon said substrate base;

a first insulation layer (G1) being fabricated upon a central portion of said S1 layer;

a second insulation layer being fabricated upon outer portions of said S1 layer;

electrical lead members being formed within said S1 layer and upon said second insulation layer;

a magnetoresistive (MR) sensor being formed upon said G1 layer;

hard bias elements being formed at edge portions of said MR sensor, and upon portions of said electrical lead members;

a second insulation layer (G2) being formed upon said MR sensor and said hard bias elements; and a second magnetic shield layer (S2) being formed upon said G2 layer.

2. A magnetic head as described in claim 1, wherein outer portions of said MR sensor element are fabricated upon portions of said electrical lead members.

3. A magnetic head as described in claim 2, wherein two said electrical lead members are formed within said S1 shield, and wherein portions of said electrical lead members are separated by a width W that substantially defines the read track width of said read head portion of said magnetic head.

4. A magnetic head as described in claim 3, wherein said read track width W is approximately 0.1 microns to approximately 0.2 microns.

5. A magnetic head as described in claim 1, wherein the thickness of said G1 layer is from approximately 10 Å to approximately 200 Å.

6. A magnetic head as described in claim 5, wherein the thickness of said G1 layer is approximately 100 Å.

7. A magnetic head as described in claim 5, wherein a spacing between said S1 shield and said S2 shield is from approximately T+110 Å to T+400 Å, where T is the thickness of said MR sensor.

8. A magnetic head as described in claim 7, wherein said spacing is approximately 600 Å, and wherein said G1 layer has a thickness of approximately 100 Å.

9. A method for fabricating a read head portion of a magnetic head, comprising the steps of:

fabricating a first magnetic shield (S1) layer upon a substrate base;

fabricating a first electrically insulative (G1) layer upon said S1 layer;

fabricating electrical lead trenches through said G1 layer and into said S1 layer;

depositing a second electrically insulative material into said electrical lead trenches;

fabricating electrical leads upon said second electrically insulative material within said electrical lead trenches;

fabricating magnetoresistive (MR) sensor layers upon said G1 layer;

fabricating hard bias elements upon portions of said electrical leads at outer edge portions of said MR sensor layers;

fabricating a second electrically insulative (G2) layer upon said MR sensor layers and said hard bias elements; and fabricating a second magnetic shield (S2) layer upon said G2 layer.

10. A method for fabricating a magnetic head as described in claim 9, wherein portions of said MR sensor layers are fabricated on top of portions of said electrical leads.

11. A method for fabricating a magnetic head as described in claim 10, wherein two said electrical leads are separated by a width W, wherein said width W substantially defines the read track width of said magnetic head.

12. A method for fabricating a magnetic head as described in claim 11, wherein said read head track width W is from approximately 0.1 to approximately 0.2 microns.

13. A method for fabricating a magnetic head as described in claim 9, wherein said magnetic head has a spacing between said S1 shield layer and said S2 shield layer of from approximately T+110 Å to approximately T+400 Å where T is the thickness of said MR sensor layer.

14. A method for fabricating a magnetic head as described in claim 13, wherein said G1 layer is fabricated with a thickness of from approximately 10 Å to approximately 200 Å.

15. A method for fabricating a magnetic head as described in claim 14, wherein said spacing is approximately 600 Å, and wherein said G1 layer has a thickness of approximately 100 Å, and said magnetic head has a read track width W of approximately 0.15 microns.

16. A hard disk drive including a magnetic head having a read head, comprising:

a substrate base;

a first magnetic shield layer (S1) being fabricated upon said substrate base;

a first insulation layer (G1) being fabricated upon a central portion of said S1 layer;

a second insulation layer being fabricated upon outer portions of said S1 layer;

electrical lead members being formed within said S1 layer and upon said second insulation layer;

a magnetoresistive (MR) sensor being formed upon said G1 layer;

hard bias elements being formed at edge portions of said MR sensor, and upon portions of said electrical lead members;

a second insulation layer (G2) being formed upon said MR sensor and said hard bias elements; and a second magnetic shield layer (S2) being formed upon said G2 layer.

17. A hard disk drive as described in claim 16, wherein outer portions of said MR sensor element are fabricated upon portions of said electrical lead members.

18. A hard disk drive as described in claim 17, wherein two said electrical lead members are formed within said S1 shield, and wherein portions of said electrical lead members are separated by a width W that substantially defines the read track width of said read head portion of said magnetic head.

19. A hard disk drive as described in claim 18, wherein said read track width W is approximately 0.1 microns to approximately 0.2 microns.

20. A hard disk drive as described in claim 16, wherein the thickness of said G1 layer is from approximately 10 Å to approximately 200 Å.

21. A hard disk drive as described in claim 20, wherein the thickness of said G1 layer is approximately 100 Å.

22. A hard disk drive as described in claim 20, wherein a spacing between said S1 shield and said S2 shield is from approximately T+110 Å to approximately T+400 Å, where T is the thickness of said MR sensor.

23. A hard disk drive as described in claim 22, wherein said spacing is approximately 600 Å, and wherein said G1 layer has a thickness of approximately 100 Å.

* * * * *